(12) United States Patent
Zhou

(10) Patent No.: US 6,690,325 B1
(45) Date of Patent: Feb. 10, 2004

(54) METHOD AND APPARATUS FOR GENERATING TRUE TIME DELAYS

(75) Inventor: Wimin Zhou, Rockville, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 10/176,040

(22) Filed: Jun. 21, 2002

(51) Int. Cl.[7] .................................................. H01Q 3/22
(52) U.S. Cl. ........................................................ 342/375
(58) Field of Search ................................ 342/375, 368; 343/758, 765, 766; 359/290

(56) References Cited

U.S. PATENT DOCUMENTS

| | | | | |
|---|---|---|---|---|
| 3,029,432 A | * | 4/1962 | Hansen | 342/375 |
| 3,039,097 A | * | 6/1962 | Strumwasser | 342/375 |
| 3,324,475 A | * | 6/1967 | Mine | 342/375 |
| 3,438,035 A | * | 4/1969 | Fling | 342/375 |
| 4,348,680 A | * | 9/1982 | Collier | 342/375 |
| 4,742,355 A | * | 5/1988 | Wolfson et al. | 342/375 |
| 4,864,308 A | * | 9/1989 | Raab et al. | 342/375 |
| 5,231,405 A | * | 7/1993 | Riza | 342/375 |
| 5,274,385 A | * | 12/1993 | Riza | 342/375 |
| 5,668,629 A | * | 9/1997 | Parker et al. | 342/376 |
| 5,926,134 A | * | 7/1999 | Pons et al. | 342/375 |
| 6,175,671 B1 | * | 1/2001 | Roberts | 359/337 |
| 2002/0021878 A1 | * | 2/2002 | Allan et al. | 385/129 |
| 2002/0048422 A1 | * | 4/2002 | Cotteverte et al. | 385/4 |
| 2003/0001915 A1 | * | 1/2003 | Askeland et al. | 385/50 |
| 2003/0048993 A1 | * | 3/2003 | Shi et al. | 385/50 |

OTHER PUBLICATIONS

I. Frigyes, Optically generated true–time delay in phased–array antennas, IEEE Transactions on Microwave Theory and Techniques, vol. 43(9), p. 2378–2386, Sep. 1995.*

* cited by examiner

Primary Examiner—Thomas H. Tarcza
Assistant Examiner—F H Mull
(74) Attorney, Agent, or Firm—William V. Adams

(57) ABSTRACT

An optical method and apparatus for generating true time delay signals for a phased array antenna. An optical beam is directed along a series of N paths of equal length L having U-turns therebetween and optical sub-beams are extracted at ends of the N paths and converted to electrical signals to create the true time delays.

20 Claims, 3 Drawing Sheets

WAVEGUIDE
CHANNEL

METHOD AND APPARATUS FOR GENERATING TRUE TIME DELAYS

RELATED APPLICATIONS

This application is related to U.S. application Ser. No. 09/595,542, filed Jun. 16, 2000, which issued as U.S. Pat. No. 6,388,616 on May 14, 2002.

STATEMENT OF GOVERNMENT INTEREST

The invention described herein may be manufactured, used and/or licensed by or for the Government of the United States of America.

FIELD OF THE INVENTION

The present invention relates to the field of optically controlled phased array antennas/radar and optical signal processing/communication. More particularly, the present invention relates to a simple method and apparatus of creating continuous true time delays in a photonic beam array system which can be used to produce a microwave beam array with the same time delays in order to control/steer the propagation direction of the phased array antenna. It can also be related to a method to make optical analog-to-digital encoding, optical beam steering etc. for the application of optical signal processing communication.

BACKGROUND OF THE INVENTION

Phased array antenna systems are well known in the art. Such systems can be used, for example. to track objects of interest such as aircraft or missiles. and in high data rate mobile wireless communications. To steer a microwave beam from a phased array antenna one needs to create a time delay Δt between the electromagnetic waves generated from each of the neighboring antenna elements in a particular direction. Therefore a time delay array is needed. Traditionally, a time delay was made by a microwave electronic delay device or an electronic phase shifter (not a true time delay). However, for the large number of array elements needed, those electronic devices and waveguides (cables) are very bulky. or very expensive for high frequency systems and yield poor results.

In the last ten years, extensive efforts worldwide have been made to develop an optically controlled phased array antenna in which the time delay arrays are generated in the optical domain and then carry over to the microwave domain using optical fibers. In such a system, size, weight, power consumption are dramatically reduced. There are hundreds of proposed schemes to generate such true time delay arrays, but most of them have significant technical difficulties or have very expensive materials/assembly cost due to their system complexity. In general, for an N-elements antenna most schemes need one laser light source with a 1×N light splitter or N laser sources, and at least $2^7$ (128) switches for each light channel to direct the light to the appropriate true-time-delay (TTD) path. or uses a wavelength division multiplex (WDM) device to distribute multi-color lasers to one time delay generator, then, redistributes by another WDM device the light beams to the appropriate channels for the detectors/antenna elements. Accordingly, there exists a need in the art to have a simplified system to generate the true time delay inexpensively. The present invention can significantly simplify such system by eliminating all the switches, 1×N splitters. WDM devices and is capable of using only a single laser source.

SUMMARY OF THE INVENTION

In accordance with the present invention, the above advantages are achieved by providing an optical beam direction the optical beam along a series of N paths of equal length L having U-turns therebetween, providing an identical length change ΔL for each of the N paths. or an index change in the N optical paths with fix length L, extracting optical sub-beams from the optical beams at the ends of selected ones of the N paths and converting the optical sub-beams to electrical signals.

BRIEF DESCRIPTION OF DRAWINGS

The invention will be better understood by referring to the accompanying drawings, wherein.

DETAILED DESCRIPTION OF PREFERRED EMBODIMENTS

Figure 1:
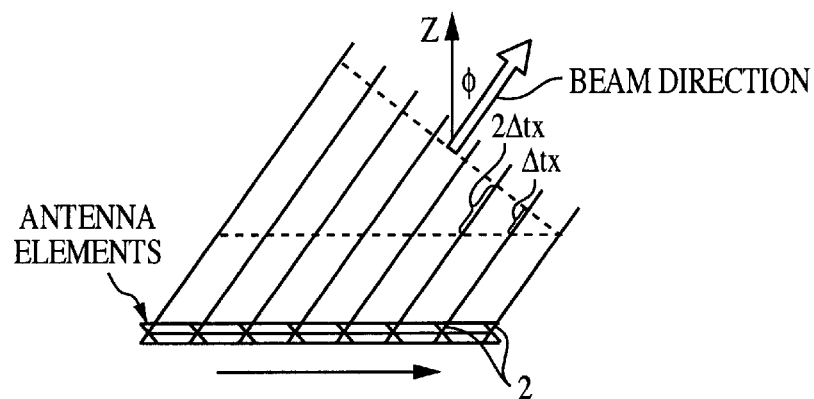
FIG. 1 shows a typical one dimensional phased array antenna.

FIG. 1 shows a typical one dimensional phased array antenna comprised of a plurality of antenna elements 2. φ is the angle between the normal axis Z and the beam propagation direction. Between each two neighboring antenna elements, there is a time delay Δt for the waves emitted/received by the elements, causing a different travelling distance cΔt. respectively. Therefore, for the $n^{th}$ element. there is nΔt time delay with respect to the first element.

Figure 2:
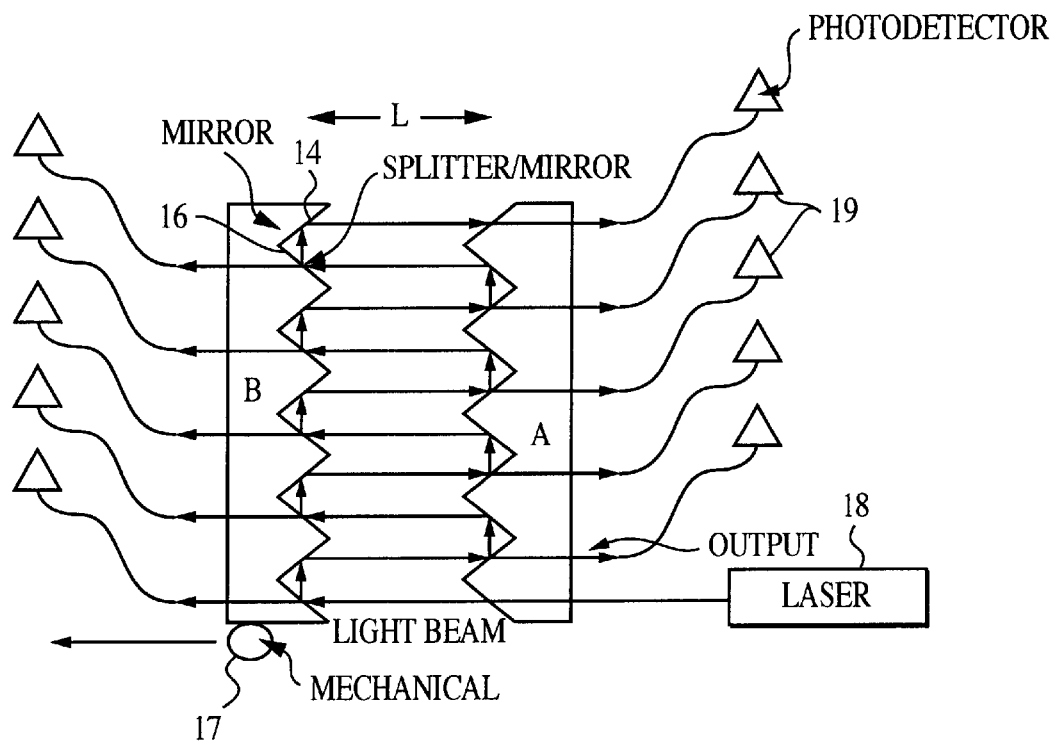
FIG. 2 shows an embodiment of the present invention wherein the optical paths are in free space.

The true-time-delay generator of the present invention (as shown in FIG. 2) takes only one RF-microwave modulated laser beam that is launched into an architecture that guides the light beam. modulated by microwave to traverse a series of N paths of identical length L with double U-turns created either by reflections or by waveguiding. These light paths are bounced between two parts A and B. A mechanical device can make a relative movement between A and B to change the length L by ΔL for each path simultaneously. At U-turns, a designated percentage of the light will be tapped by a light power splitter into a corresponding output port terminated with a photodetector which generates the microwave signal. There are equal amounts of time delay Δt for each two microwave signals generated by two consecutive detectors. The N outputs will have time delays of 1Δt, 2Δt, 3Δ . . . NΔt, respectively, and have desired $P_1, P_2, \ldots P_N$ output powers, respectively to feed the antenna array elements with desired power distribution. Δt can be varied from $-\Delta T_{max}$ to $\Delta T_{max}$ where $\Delta T_{max}$ is the time delay corresponding the maximum angle of the beam steering in one direction.

This architecture can be realized by either free-space optical systems or waveguided systems. FIG. 2 shows a free-space optical system employing members A and B having opposing interior surfaces at which are situated mirrors 14 and beamsplitter/mirrors 16. A collimated input light from laser 18 is reflected by 45° mirrors 14 and tapped by optical power splitting mirrors 16 at the end of each of the N paths as shown in the figure. The electrical time delayed outputs are provided by photodetectors 19. A mechanical device 17 such as a stepping motor is arranged to change the spacing between members A and B to change the time delay. There are initial true-time delays at a starting position of the generator. An external fixed time delay array can be generated by microwave cables or optical fibers to compensate for the initial time delays or even an opposite maximum time delay corresponding to the maximum negative steering angle can be used.

Figure 3:
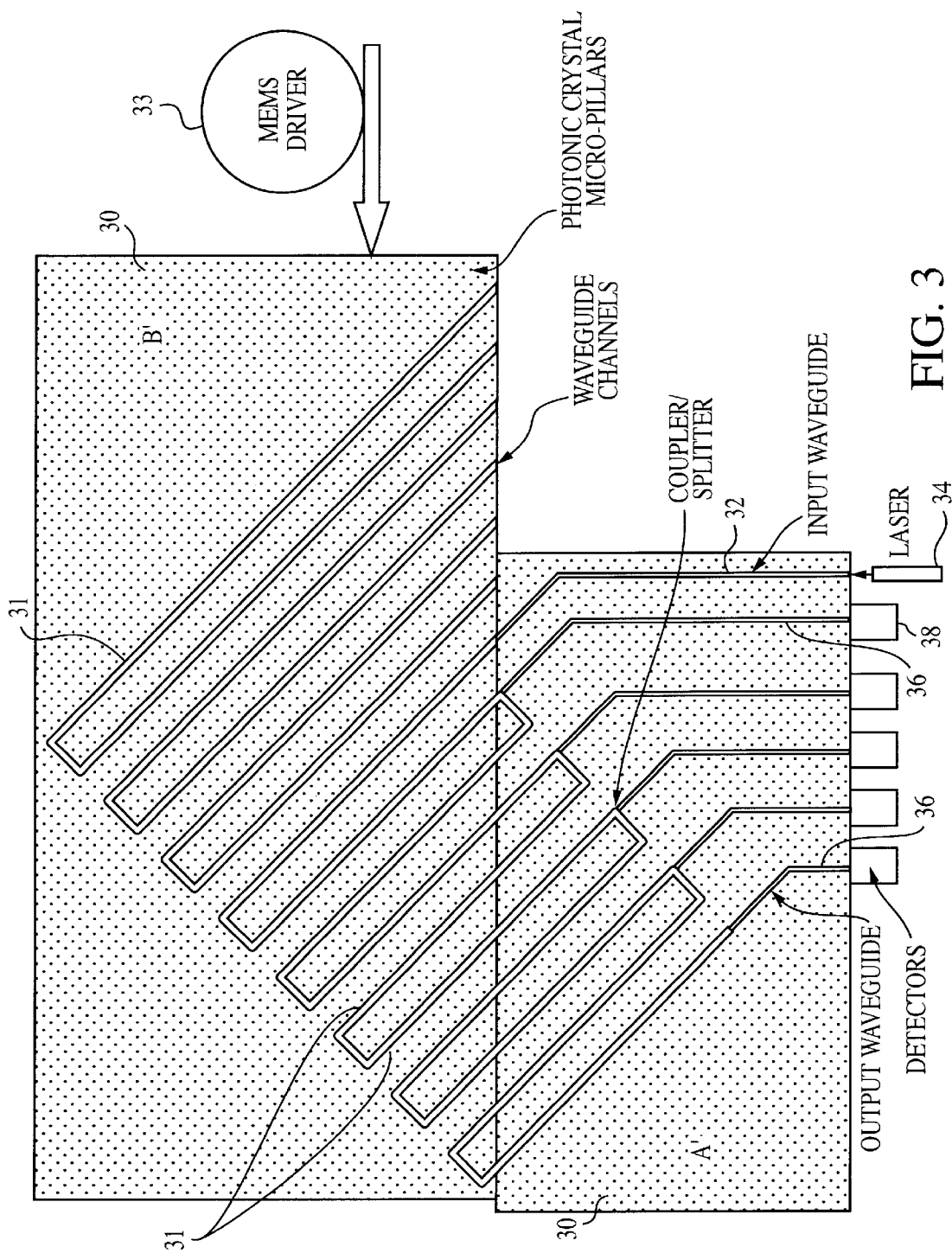
FIG. 3 shows an embodiment of the present invention wherein the optical paths are waveguide channels in photonic crystal material.
Figure 4:
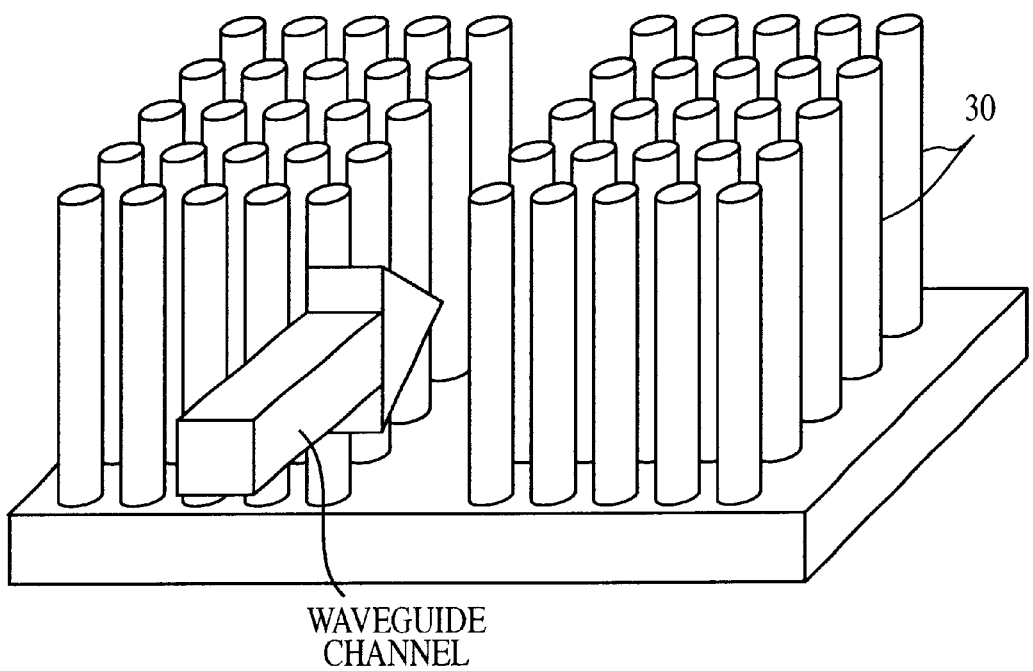
FIG. 4 shows the pillars of the photonic crystal material and a waveguide channel.

FIG. 3 is a schematic illustration of an embodiment of a waveguide true-time-delay unit. The unit consists of two parts, A' and B'. Since the light has to travel between part A' and part B', to reduce the insertion loss it is preferable to use a known type of optical waveguide created by photonic crystal material where the photonic band gap are made by latticed columns (or pillars), while the waveguide may be defined in a defect line where the pillars are missing. The dots 30 in FIG. 3 represent the 2 dimensional view of the pillars (top view). The light is confined in the air region where the "defect line" is as indicated by the lines 31, 32, and 36 in FIG. 3. FIG. 4 shows a 3-dimensional sketch of the photonic crystal waveguide. It is possible to use the traditional optical waveguide structure with cladding/core/cladding where the light is guided in a high index core material. Although, traditional waveguide material is easier to make, the photonic crystal waveguide unit will offer smaller size, lower insertion loss and easy to make U-turns.

The waveguide channels 31 are at 45° with the contacting edge surfaces of parts A' and B'. Part A' includes an input waveguide 32 where a laser beam from laser 34 is coupled in. FIG. 3 shows the initial position between part A' and B'. The light beam follows the waveguide path to enter into part B' and make a U-turn, then come back to part A'. At the first U-turn in part A', the waveguide is designed such that a small percentage of the light is distributed ("leaked") into an output waveguide 36 which goes to a photodetector 38 at the end. The rest of the light will U-turn, travel another round trip at both parts A' and B'. Another small percentage of light will be sent into the second detector. The total initial paths for the light to arrive at each detector will be D1, D2, ... Dn. The difference in the light path length between each neighbored detector is $2L_0 + \Delta D$, where $L_0$ is one L shaped path in the main waveguide region, $\Delta D$ is the length difference between two neighboring output waveguides. One can design the output waveguide such that its length is always longer than the next one to compensate for the $2 \times L_0$. In this case D1, D2 ... will be all 0.

A mechanical control device 33 (a motor or a micro-electro-mechanical system) can make a relative displacement between parts A' and part B' in a direction that is in 45° with the waveguide path. (A' and B' are always in contact). When part B' shifts exactly one U-waveguide repeat period, the waveguide in part A' and part B' are all aligned again. But there is a $2 \times \Delta l$ light path length change between each two consecutive outputs. Therefore an array of $1(2\Delta l)$, $2(2\Delta l)$, $3(2\Delta l)$, ... $N(2\Delta l)$, in path difference respectively are created at the output detector array. Let $\Delta tc = 2\Delta l$, where c is the speed of light, the unit then generates an array of light beams having the true-time delays $1\Delta t$, $2\Delta t$, $3\Delta t$, ... $N\Delta t$, respectively which correspond to a steering of the microwave beam front to one direction (right for example) from the phased array antenna.

Figure 5:
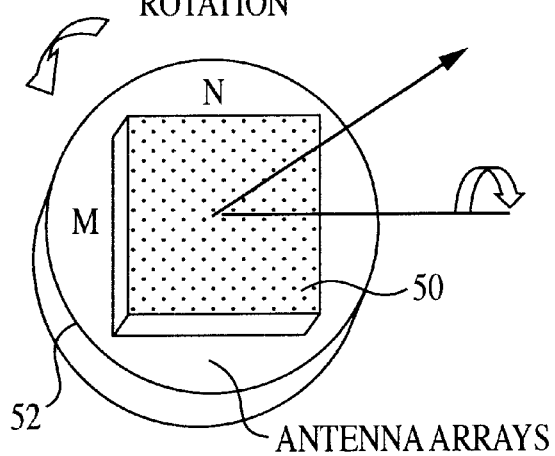
FIG. 5 shows a two dimensional phased array antenna.

To effect 2-dimensional steering, one can combine many 1-dimensional TTD generators to perform the 2 dimensional time-delays, or use the embodiment in FIG. 5.

FIG. 5 is a block diagram for a 2-dimensional phased array antenna 50 containing a one-dimensional TTD) unit that is semi-mechanically steered. The 1-dimensional TTD generator's N outputs are fed to an N×M element 2-dimensional antenna panel by feeding each column of M-elements with one output. This will collimate the microwave beam in the column direction but not provide time delay in that direction. The time-delays are provided between the columns for 1-dimensional steering. By mounting the antenna panel on a rotating disk 52, the antenna then, can steer 2-dimensionally. It is also possible to have the antenna panel to rotate around a central axis along the row direction for an alternative way of 2D steering.

As shown in FIG. 3 for the TTD generator unit, the parts A' and B' can be made by Si, III–V semiconductor or other dielectric materials. The multi-U-shape waveguides are at 45° with the contacting side between A' and B'. Although many different type of optical waveguide structure might be used, it is preferred to use the waveguide made by "pillar"-type photonic band-gap materials as shown in FIG. 4. If a squared photonic crystal unit cell is used, it should align in 45° with a major crystal axis of the base material so that part A' and B' can be made together on one substrate and then separated by a simple cleave along the substrate crystal axis. If 1.55 $\mu$m wavelength light is used, the lattice constant of the photonic crystal is in the order of 1 micrometer. The photonic crystal pillars can be fabricated by direct e-beam writing and dry-etching technique. The multi-U-shape of the waveguide paths can be defined by removing one-line of pillars as shown in FIG. 3 and separated by 3 or 4 periods of lattice between two neighboring waveguide channels. One can use a "photonic crystal defect" to leak a small percentage of light from the main U-shape waveguide channel to the output waveguides. For a system with N-elements/channels, one can distribute 1/N of light to the first output, and gradually increase the percentage for each of the next outputs until 100% light distribution to the last (Nth) output. Therefore, all the detectors will get an even amount of light power or a non uniform light power distribution can be made such as a Dolph-Tschebyscheff polynomial distribution.

A mechanical driving device such as a micro-electro-mechanical system (MEMS) or a regular stepping motor will be used to make a translation between part A' and B'. The move will be in steps. For each step, each U-waveguide in part A' will with the next (i-shaped waveguide in part B'. Therefore, if the waveguides are separated by 3 periods/pillars/lattice constants, there is an increase in the total path length for each U-trip of 16 lattice constant. If the antenna's microwave frequency is 30 GHz, one need approximately 4.3 mm displacement to made a 0°–60° angle steering. For 16 $\mu$m-step movement, there are about 268 steps resolution for 0°–60° angle.

There thus has been described an improved method and apparatus for generating true time delays. While the invention has been disclosed in connection with preferred embodiments variations will occur to those skilled in the art, and the invention to be covered is defined in the claims appended hereto.

I claim:

1. A method of generating true time delayed electrical signals, comprising the steps of:

providing an optical beam, modulated by a microwave;

directing the optical beam along a series of N paths of equal length L having U-turns therebetween wherein L is variable;

extracting optical sub-beams from the optical beam at the ends of selected ones of the N paths; and converting the optical sub-beams to electrical signals to provide the true time delayed electrical signal between two neighboring electric channels.

2. The method of claim 1 wherein the N paths are in free space.

3. The method of claim 1 wherein the-N paths are in optical waveguides.

4. The method of claim 1 wherein the selected ones of the N paths comprise every one of the N paths.

5. The method of claim 1 wherein the selected ones of the N paths comprise every other of the N paths.

6. An apparatus for generating true time delayed electrical signals, comprising:

means for providing an optical beam;

means for directing the optical beam along a series of N paths of equal length L having U-turns therebetween wherein L is variable;

means for extracting optical sub-beams from the optical beam at the ends of selected ones of the N paths; and means for converting the optical sub-beams to electrical signals to provide the true time delayed electrical signals.

7. The apparatus of claim 6 wherein said means for directing the optical beam comprises a pair of members separated by free space and having opposing interior surfaces at which are situated angled mirrors and mirror/beam splitters, wherein said mirrors and mirror/beam splitters create said U-turns and said mirror/beam splitters extract said optical sub-beams.

8. The apparatus of claim 7 wherein said mirror/beam splitters extract said optical sub-beams at the end of every one of said N paths.

9. The apparatus of claim 8 further including a mechanical device for changing the separation of the pair of members to change the true time delays.

10. The apparatus of claim 9 wherein the means for converting the optical sub-beams to electrical signals comprises a plurality of photodetectors.

11. The apparatus of claim 6 wherein the means for directing is comprised of first and second members made of photonic crystal material where the photonic band gap is made by a lattice of columns or pillars, and optical waveguides are defined in defect lines where the pillars are missing.

12. The apparatus of claim 11 where the N paths correspond to optical waveguide channels in the first and second members, at least some of said waveguide channels being formed partly in said first member and partly in said second member, wherein said first and second members contact each other such that the waveguide channels are continuous.

13. The apparatus of claim 12 wherein the second member contains more waveguide channels than the first member.

14. The apparatus of claim 13 wherein the means for extracting optical sub-beams comprises output waveguides in the first member.

15. The apparatus of claim 14 wherein the output waveguides are located at the ends of every other of the waveguide channels.

16. The apparatus of claim 15 wherein the means for converting the optical sub-beams to electrical signals comprises a photodetector located at the end of each output waveguide.

17. The apparatus of claim 16 wherein the first and second members contact each other along flat faces thereof, and wherein the waveguide channels are cut at an angle to the flat faces.

18. The apparatus of claim 17 further including means for moving the second member in relation to the first member while maintaining contact therewith so that new waveguide channels in said second member may be joined with waveguide members in said first member to change the time delay.

19. The apparatus of claim 6 in combination with a phased array antenna.

20. The apparatus of claim 19 wherein the phased array antenna is 2-dimensional and is located on a rotating disk for 2-dimensional steering.

\* \* \* \* \*